US012243562B2

(12) United States Patent
Yan et al.

(10) Patent No.: US 12,243,562 B2
(45) Date of Patent: Mar. 4, 2025

(54) METHOD AND APPARATUS FOR MULTIMEDIA RESOURCE CLIPPING SCENARIO, DEVICE AND STORAGE MEDIUM

(71) Applicant: Beijing Zitiao Network Technology Co., Ltd., Beijing (CN)

(72) Inventors: Ying Yan, Beijing (CN); Yingzhi Zhou, Beijing (CN); Ran Cui, Beijing (CN); Ping Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/544,342

(22) Filed: Dec. 18, 2023

(65) Prior Publication Data

US 2024/0119970 A1 Apr. 11, 2024

Related U.S. Application Data

(63) Continuation of application No. PCT/CN2022/133460, filed on Nov. 22, 2022.

(30) Foreign Application Priority Data

Nov. 22, 2021 (CN) .......................... 202111389285.9

(51) Int. Cl.
 *G11B 27/031* (2006.01)
 *G11B 27/34* (2006.01)
(52) U.S. Cl.
 CPC ............ *G11B 27/031* (2013.01); *G11B 27/34* (2013.01)
(58) Field of Classification Search
 CPC .............................. G11B 27/031; G11B 27/34
 (Continued)

(56) References Cited

U.S. PATENT DOCUMENTS 11,153,657 B1 10/2021 Woodman
2007/0283236 A1 12/2007 Sugiura et al.
(Continued)

FOREIGN PATENT DOCUMENTS

CN 101901622 A 12/2010
CN 110139159 A 8/2019
(Continued)

OTHER PUBLICATIONS

China National Intellectual Property Office, International Search Report issued in PCT Application No. PCT/CN2022/133460, Jan. 20, 2023, WIPO, 9 pages.
(Continued)

*Primary Examiner* — Thai Q Tran
*Assistant Examiner* — Stephen R Smith
(74) *Attorney, Agent, or Firm* — Alleman Hall & Tuttle LLP

(57) ABSTRACT

Embodiments of the present disclosure disclose a method and apparatus for a scenario of editing multimedia resources, a device and a storage medium. The method includes: in response to an editing instruction triggered for a target editing template, displaying an import page of a material segment to be edited corresponding to the target editing template, wherein a setting entry for the material segment to be edited and a prompt entry for the material segment to be edited are presented on the import page; in response to a trigger for the prompt entry, displaying an original material segment corresponding to the material segment to be edited; in response to a trigger operation for the setting entry, determining the material segment to be edited; and editing the material segment to be edited into a target multimedia resource in a target editing mode indicated by the target editing template.

20 Claims, 6 Drawing Sheets

(58) Field of Classification Search
USPC .................. 386/241, 278, 282, 290
See application file for complete search history.

(56) References Cited

U.S. PATENT DOCUMENTS

| | | | |
|---|---|---|---|
| 2009/0132075 A1* | 5/2009 | Barry | G11B 27/34 700/94 |
| 2010/0153520 A1* | 6/2010 | Daun | G11B 27/034 709/218 |
| 2010/0305726 A1 | 12/2010 | Lu et al. | |
| 2010/0332560 A1* | 12/2010 | Gerbasi, III | G11B 27/34 707/812 |
| 2012/0007892 A1* | 1/2012 | Ohkubo | G11B 27/034 345/667 |
| 2013/0195429 A1* | 8/2013 | Fay | H04L 41/22 715/744 |
| 2015/0318020 A1* | 11/2015 | Pribula | H04N 21/2743 386/290 |
| 2018/0040349 A1* | 2/2018 | Xie | G11B 27/036 |
| 2021/0005223 A1* | 1/2021 | Wang | G06F 3/0482 |
| 2021/0225406 A1 | 7/2021 | Han et al. | |
| 2022/0238139 A1* | 7/2022 | Zheng | H04N 21/472 |
| 2022/0343952 A1* | 10/2022 | Lopez | G11B 27/005 |
| 2024/0040236 A1* | 2/2024 | Albi | G11B 27/031 |

FOREIGN PATENT DOCUMENTS

| | | |
|---|---|---|
| CN | 110536177 A | 12/2019 |
| CN | 111357277 A | 6/2020 |
| CN | 111866587 A | 10/2020 |
| CN | 112004136 A | 11/2020 |
| CN | 112511906 A | 3/2021 |
| CN | 112866796 A | 5/2021 |
| CN | 113452941 A | 9/2021 |
| WO | 2019227283 A1 | 12/2019 |
| WO | WO-2020107297 A1 * | 6/2020 |

OTHER PUBLICATIONS

European Patent Office, Extended European Search Report Issued in Application No. 22895013.5, Sep. 13, 2024, 33 pages.
China National Intellectual Property Administration, First Search Report Issued in Application No. 2021113892859, Oct. 19, 2024, 2 pages.
Communication pursuant to Rules 70(2) and 70a(2) EPC for European Application No. 22895013.5, mailed Oct. 1, 2024, 1 page.
First Office Action for Chinese Application No. 202111389285.9, mailed Oct. 19, 2024, 20 Pages.
China National Intellectual Property Administration, First supplementary notice for chinese application No. CN202111389285.9 mailed on Jan. 21, 2025, 21 pages.

* cited by examiner

METHOD AND APPARATUS FOR MULTIMEDIA RESOURCE CLIPPING SCENARIO, DEVICE AND STORAGE MEDIUM

CROSS-REFERENCE TO RELATED APPLICATION

This application is a Continuation application of International Patent Application No. PCT/CN2022/133460, filed Nov. 22, 2022, which claims priority to Chinese Application No. 202111389285.9, filed Nov. 22, 2021, the disclosures of which are incorporated herein by reference in their entities.

FIELD

Embodiments of the present disclosure relate to the technical field of computers, for example, relate to a method and apparatus for a scenario of editing multimedia resources, a device and a storage medium.

BACKGROUND

With the rapid development of terminal technology, many devices have photographing functions, so that users can conveniently record wonderful moments in daily lives by photographing photos or videos. In order to acquire better visual effects, the users often expect to edit multimedia materials such as photos or videos, so as to obtain edited videos. Accordingly, many application programs supporting video editing functions emerge as the times require.

At present, the operation process of a video editing application is tedious and complex, therefore, the editing efficiency is relatively low, and thus improvements are desired.

SUMMARY

Embodiments of the present disclosure provide a method and apparatus for a scenario of editing multimedia resources, a storage medium and a device, which may improve solutions for scenarios of editing multimedia resources in the related art.

In a first aspect, an embodiment of the present disclosure provides a method for a scenario of editing multimedia resources, including:

in response to an editing instruction triggered for a target editing template, displaying an import page of at least one material segment to be edited corresponding to the target editing template, wherein the at least one segment to be edited includes a target material segment to be edited, and a setting entry for the target material segment to be edited and a prompt entry for the target material segment to be edited are presented on the import page of the target material segment to be edited;

in response to a trigger for the prompt entry on the import page of the target material segment to be edited, displaying a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on an one-to-one basis, and the at least one original material segment includes the target original material segment;

in response to a trigger operation for the setting entry on the import page of the target material segment to be edited, determining the target material segment to be edited; and in response to determining that the at least one material segment to be edited has been determined, editing the at least one material segment to be edited into a target multimedia resource in the target editing mode.

In a second aspect, an embodiment of the present disclosure provides an apparatus for a scenario of editing multimedia resources, including:

an import page display module, configured to: in response to an editing instruction triggered for a target editing template, display an import page of at least one material segment to be edited corresponding to the target editing template, wherein the at least one segment to be edited includes a target material segment to be edited, and a setting entry for the target material segment to be edited and a prompt entry for the target material segment to be edited are presented on the import page of the target material segment to be edited;

an original material segment display module, configured to: in response to a trigger for the prompt entry on the import page of the target material segment to be edited, display a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment includes the target original material segment;

a determining module for the material segment to be edited, configured to: in response to a trigger operation for the setting entry on the import page of the target material segment to be edited, determine the target material segment to be edited; and an editing module, configured to: in the case that the at least one material segment to be edited has been determined, edit the at least one material segment to be edited into a target multimedia resource in the target editing mode.

In a third aspect, an embodiment of the present disclosure provides an electronic device, including: a memory, a processor, and a computer program stored on the memory and executable on the processor, wherein when executing the computer program, the processor implements the method for a scenario of editing multimedia resources provided according to embodiments of the present disclosure.

In a fourth aspect, an embodiment of the present disclosure provides a computer-readable storage medium, on which a computer program is stored, wherein when executed by a processor, the program implements the method for a scenario of editing multimedia resources provided according to embodiments of the present disclosure.

DETAILED DESCRIPTION OF EMBODIMENTS

It should be understood that various steps recited in method embodiments of the present disclosure may be performed in a different order and/or in parallel. Moreover, the method embodiments may include additional steps and/or omit performing the steps shown. The scope of the present disclosure is not limited in this respect.

As used herein, the terms "include" and variations thereof are open-ended terms, i.e., "include, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that definitions such as "first" and "second" mentioned in the present disclosure are only intended to distinguish between different apparatuses, modules or units, and are not intended to limit the order or interdependence of the functions performed by these apparatuses, modules or units.

It should be noted that the modifiers such as "one" and "more" mentioned in the present disclosure are intended to be illustrative and not restrictive, and those skilled in the art should understand that the modifiers should be interpreted as "one or more" unless the context clearly indicates otherwise.

The names of messages or information interacted between multiple apparatuses according to the embodiments of the present disclosure are for illustrative purposes only and are not intended to limit the scope of such messages or information.

In multiple embodiments described below, each embodiment provides example features and examples at the same time, multiple features recorded in the embodiments may be combined to form multiple example solutions, and each numbered embodiment should not be considered as only one technical solution.

Figure 1:
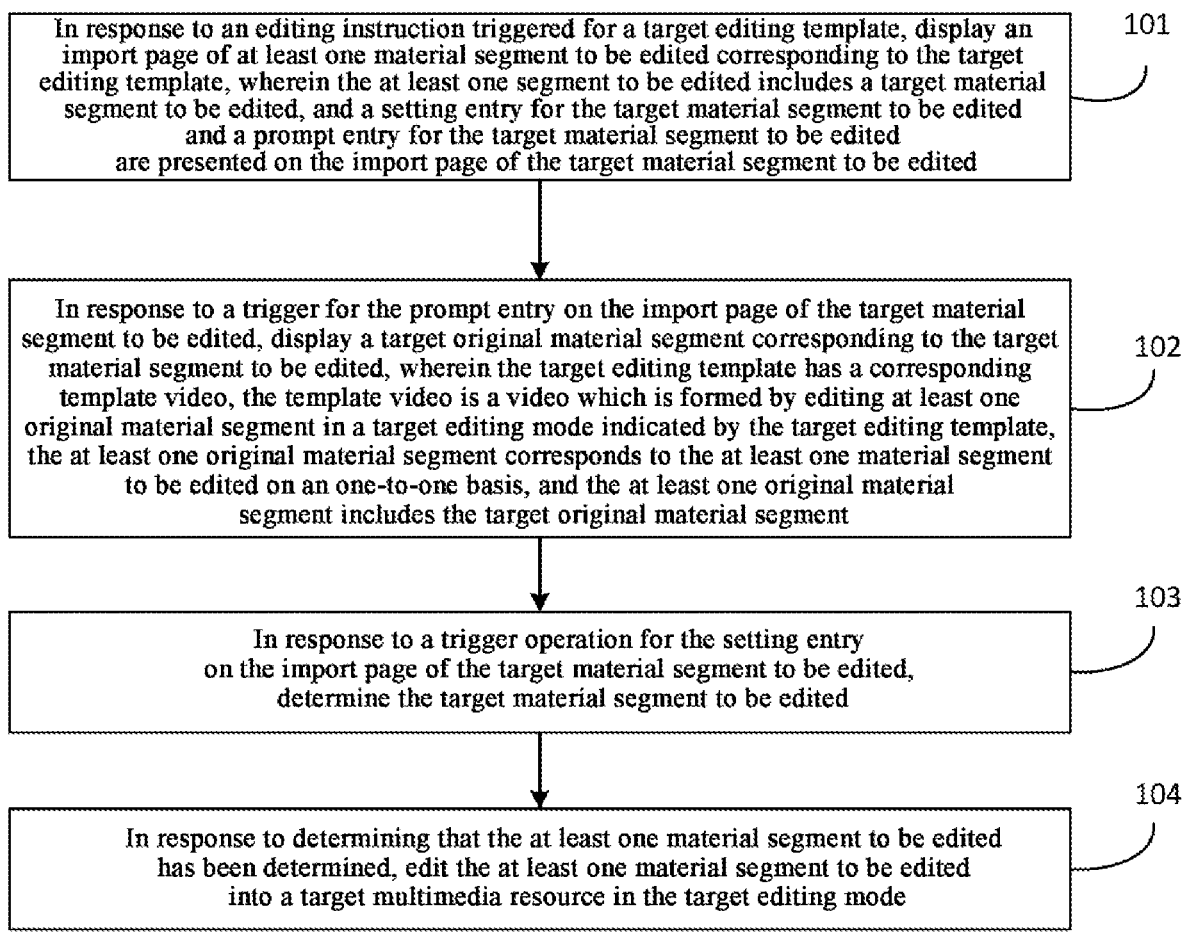
FIG. 1 is a schematic flowchart of a method for a scenario of editing multimedia resources provided according to an embodiment of the present disclosure.

FIG. 1 is a schematic flowchart of a method for a scenario of editing multimedia resources according to an embodiment of the present disclosure. The method may be executed by an apparatus for a scenario of editing multimedia resources, wherein the apparatus may be implemented by software and/or hardware, and may be generally integrated in an electronic device. The electronic device may be a mobile device such as a mobile phone, a smart watch, a tablet computer, and a personal digital assistant, or other devices such as a desktop computer. The method for the scenario of editing multimedia resources according to embodiments of the present disclosure may be applied to a scenario in which a multimedia material is selected for an editing template. As shown in FIG. 1, the method may include:

Step 101, in response to an editing instruction triggered for a target editing template, displaying an import page of at least one material segment to be edited corresponding to the target editing template, wherein the at least one material segment to be edited may include a target material segment to be edited. A setting entry for the target material segment to be edited and a prompt entry for the target material segment to be edited are presented on the import page of the target material segment to be edited.

For example, the method for the scenario of editing multimedia resources may be applied to a preset application program, and the preset application program may be, for example, an application program having an editing function, which is installed in an electronic device. The editing function may be understood as a function of selecting, clipping, splicing, or arranging a multimedia material (hereinafter referred to as a material), to obtain a multimedia resource such as an edited video. For reasons such as reducing the editing difficulty and improving the editing efficiency, the preset application program may provide an editing template for a user, the editing template is used for editing a multimedia material to obtain a multimedia resource such as an edited video (for ease of description, an edited video is taken as an example below). The editing template may be referred to as a template for short, the editing template may include an editing mode, and the editing template is used for instructing to edit a multimedia material to be edited into a multimedia resource according to an editing mode in the editing template. That is, the edited video which is edited by using the editing template may match the editing mode included in the editing template, thereby achieving an effect of editing in the same style. The multimedia material may include, for example, an image, a video, an audio, or the like. The multimedia material may include a material acquired under an operation such as the current photographing implemented by the user. The multimedia material may include a material locally stored in the electronic device. The multimedia material may further include a material acquired by means of network downloading or the like. Taking a video as an example. For example, the video may include a video currently photographed by the user. The video may further include a photographed video that is stored in a local album of the electronic device or other types of videos. The video may include a video downloaded from the network. The editing template provided by the preset application program may include an editing template designed by a developer. The editing template may further include an editing template that is created and uploaded to a server corresponding to the preset application program by the user, and the specific source is not limited.

In an embodiment of the present disclosure, the target editing template may be understood as an editing template that is selected or being used by the current user. For example, related information of one or more editing templates may be displayed on a template display page in the preset application program, and the user may select the editing template via the related information. The related information may include a cover image of the editing template or a template video associated with the editing template. A display mode may include, for example, static display or dynamic playback. The template video may be understood as a multimedia resource generated during the creating or historical use process of the editing template, and is generally made by another user other than the current user. The user may understand information such as an editing effect of the associated editing template by viewing the template video, and then select a satisfied editing template for material edition.

In an embodiment of the present disclosure, the import page of a material segment to be edited corresponding to the target editing template may include an interface displayed when the material segment to be edited needs to be imported during a process of using the target editing template, the number may be one or more, and a specific display form and layout mode of the interface are not limited. For example, an editing instruction of the target editing template may be triggered for related information or related controls of the template editing template, so as to display the import page.

Generally, the edited video may generally include one or more material segments to be edited. More diversified editing effects may be formed by combining multiple material segments to be edited. For example, during the process of using the target editing template, an import operation generally needs to be performed for each material segment to be edited. When the import operation is performed, a certain material segment to be edited (which may be considered as a target segment to be edited) may be selected at first, and then the selected segment to be edited is imported. An import page may correspond to a segment to be edited, and at this time, it may be considered that the corresponding import page is selected. An import page may also correspond to multiple segments to be edited, and at this time, it can be considered that the target segment to be edited is selected from the multiple material segments to be edited in an import page. For example, when the target material segment to be edited is selected, the target material segment to be edited may be in an unimported state, that is, at this time, the target material segment to be edited may be imported for the first time. When the target material segment to be edited is selected, the edited segment may be in an imported state, that is, at this time, the target material segment to be edited may be replaced with an imported segment.

For example, the import page may include one or more setting entries corresponding to one or more material segments to be edited, and the setting entries are used for indicating importing the corresponding material segments to be edited. The material segments to be edited and the setting entries are generally in a one-to-one relationship, the setting entries respectively corresponding to multiple material segments to be edited may be displayed simultaneously. One setting entry corresponding to one material segment to be edited may also be displayed each time, which is not specifically limited. A display form of the setting entry is not limited. For example, it may be in a form of an icon. A segment may respectively correspond to different display states before being imported and after being imported. For example, time length information of a material segment to be edited is displayed before the segment is imported, and a thumbnail of the imported material segment to be edited is displayed after the segment is imported.

For example, the import page may further include a prompt entry corresponding to a material segment to be edited, and the prompt entry is used for indicating display of the corresponding original material segment. The material segment to be edited and the prompt entry are generally in a one-to-one relationship. Multiple prompt entries respectively corresponding to multiple material segments to be edited may be displayed in the import page simultaneously. It is also possible to only display a prompt entry corresponding to the target material segment to be edited that is currently in a selected state. Generally, there is one target material segment to be edited that is currently in the selected state. A display form of the prompt entry is not limited. For example, it may be in a form of a word, for example, "refer to original segment" or "refer to original lens", etc.

For example, there is no limitation for display positions of a setting entry and a corresponding prompt entry in the import page. A distance between the display positions of a setting entry and a corresponding prompt entry is generally within a preset distance range, so as to facilitate the user to determine the corresponding relationship therebetween. In some embodiments, the display positions of the setting entry and the corresponding prompt entry may also be multiplexed, for example, the corresponding prompt entry is displayed inside the setting entry.

Step 102, in response to a trigger for the prompt entry on the import page of the target material segment to be edited, displaying a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment includes the target original material segment.

In some embodiments, the template video is a video which is formed by editing at least one original material segment in a target editing mode indicated by the target editing template. For example, the template video is a video that is formed by applying a target editing mode indicated by the targeting editing template on at least one original material segment.

For example, in the case that multiple prompt entries are presented on the import page, the current user may select to trigger a certain prompt entry according to actual requirements, and the triggered prompt entry corresponds to the target material segment to be edited. The trigger mode of the prompt entry is not limited, that is, the trigger operation for the prompt entry may be set according to actual requirements. For example, it may be a click operation, a long-press operation, a double-click operation, or the like. In some embodiments, if the corresponding prompt entry is displayed inside the setting entry, different trigger modes may be set for the setting entry and the prompt entry. For example, the setting entry is triggered in a form of click operation, and the prompt entry is triggered in a form of the long-press operation or the double-click operation.

For example, after receiving the trigger operation of the user acting on the prompt entry, a response is made to the trigger operation, and the target original material segment corresponding to the prompt entry is displayed. That is, the target original material segment corresponding to the target material segment to be edited is displayed. For example, a first prompt entry corresponds to a first material segment to be edited, the first material segment to be edited corresponds to a first original material segment. After the user triggers the first prompt entry, it indicates that the user wants to view the original material segment of the first material segment to be edited, and thus the first original material segment corresponding to the first prompt entry is displayed. The specific display mode is not limited, for example, it is possible to skip to an original resource playback interface and directly play the target original material segment in the original resource playback interface. For another example, after skipping to the original resource playback interface, a cover image and a play button of the target original material segment are displayed in the original resource playback interface, and after the user clicks the play button, the target original material segment is started to be played. And as still another example, the target original material segment may be played in the import page in a form of a floating window, etc.

For example, after the target original material segment is played for the first time, the playback may be paused or may also be circularly performed, until exiting display under the operation of the user. For example, after exiting the original resource playback interface, it may be generally returned to the import interface. As another example, the floating window is turned off to stop the floating window from shielding the import page.

Step 103, in response to a trigger operation for the setting entry on the import page of the target material segment to be edited, determining the target material segment to be edited.

For example, after the user inputs the trigger operation for the setting entry, the material segment to be edited, which corresponds to the setting entry and needs to be imported, may be determined.

For example, the trigger operation for the setting entry includes an album-based segment selection operation. In this way, it is convenient for the user to quickly select an existing multimedia material from a local album for importing, thereby improving the editing efficiency.

For example, the trigger operation for the setting entry includes a camera-based segment photographing operation. In this way, it is convenient for the user to use a camera to photograph a material that better matches the target editing template.

For example, the trigger operation for the setting entry may include the album-based segment selection operation and the camera-based segment photographing operation simultaneously. In this way, the user may be allowed to select a source of the material segment to be edited more flexibly.

Step 104, in the case that the at least one material segment to be edited has been determined, editing the at least one material segment to be edited into a target multimedia resource according to the target editing mode.

For example, after multiple determined material segments to be edited are imported under an operation of the user, the material segments to be edited may be edited into a target multimedia resource with a corresponding effect of the target editing template according to the target editing mode indicated by the target editing template, so that the editing requirements for the user is met.

In the method for a scenario of editing multimedia resources provided in embodiments of the present disclosure, when the user selects a material segment to be edited in the import interface for the material segment to be edited corresponding to the target editing template, a corresponding original material segment may be viewed by triggering a corresponding prompt entry, so that the user may quickly select a proper material to participate in editing with reference to the content and effect in the original material segment, and accordingly, the editing efficiency and the editing effect can be improved.

In some embodiments, the setting entry and the prompt entry may be displayed in the import page simultaneously. Before triggering the setting entry corresponding to a certain material segment to be edited, the user may conveniently view the original material segment in advance, and then import a suitable material segment to be edited according to the viewed original material segment after the setting entry is triggered. The solution may be applied to an editing template in a script mode, at this time, script prompt information may be displayed in the setting entry in an associated manner. The script prompt information may be, for example, information for prompting a photographing environment, a photographing entity, photographing content, or a photographing skill.

In some embodiments, the import page may include a segment identifier corresponding to a material segment to be edited, and the segment identifier is associated with or multiplexed with the setting entry. For example, the import page may include identification information of multiple candidate materials corresponding to a segment identifier that is currently in the selected state. The prompt entry is displayed while the identification information of the candidate materials is displayed, so that it is convenient for the user to better compare the original material segment with the candidate materials, and then more efficiently and accurately select a suitable material as the material segment to be edited for importing. The candidate materials may come from, for example, an album of the electronic device, and the identification information may be, for example, a representative graph of the candidate materials, such as a cover, a thumbnail, or a video screenshot, etc.

In some embodiments, the import page includes segment identifiers respectively corresponding to multiple material segments to be edited, and a first prompt entry corresponding to a first segment identifier that currently in the selected state. In this way, it is convenient for the user to quickly locate and select, by means of the segment identifiers, a material segment to be edited that will be imported, and only the prompt entry for the selected segment identifier is displayed, thereby saving display resource in the interface. It should be noted that, if the number of edited segments contained in the target editing template is relatively large, that is, when there are a lot of segment identifiers to be displayed, a preset number of segment identifiers may be displayed simultaneously, the preset number may be determined according to a page layout mode, and the remaining segment identifiers may be displayed by means of operations such as sliding.

In some embodiments, during the process of displaying the target original material segment corresponding to the target material segment to be edited, the method may further include: displaying playback progress information of the target original material segment, wherein the playback progress information contains starting playback position information, ending playback position information and the current playback position information of the target original material segment relative to the template video. During the process of playing a certain original material segment, by means of displaying the above position information, the user may be helped to accurately locate the relative position and the playback progress of the original material segment in the whole template video, and to know information such as photographing details corresponding to different playback progresses, so that the user may conveniently select a more suitable material. The multiple pieces of position information may be displayed in a form such as a word (e.g., a second) or a legend (e.g., a time axis or a progress bar), which is not specifically limited.

In some embodiments, while the playback progress information of the target original material segment is displayed, the method further includes: displaying a playback progress control, wherein the playback progress control is configured to adjust the current playback position of the target original material segment. In this way, the user may be allowed to autonomously adjust the playback progress of the original material segment, so as to more flexibly view detail content in the original material segment.

For example, the starting playback position information and the ending playback position information of the target original material segment are displayed through a first progress bar. A first ratio of a length of the first progress bar to a length of a complete progress bar of the template video is greater than a second ratio, in which the second ratio is a ratio of the duration of the target original material segment to a total duration of the template video. The starting playback position information and the ending playback position information of the target original material segment are displayed in a form of the progress bar in a simpler, concise and visual way. With regard to the currently played target original material segment, compared with other original material segments which are not in the playback state in the template video, the progress bar is processed in an amplification way, so that the operation difficulty of adjusting the playback progress by using the playback progress control can be reduced, and thus it is convenient for the user to accurately adjust the playback progress.

In some embodiments, during the process of displaying the target original material segment corresponding to the target material segment to be edited, the method may further include: displaying a first switching control, wherein the first switching control is configured to instruct to switch to display the template video. During the process of displaying the target original material segment, it may be conveniently switched to display the template video, so that the user can view the overall content of the template video and understand an association condition of the content among multiple edited segments, so as to import a more suitable material for the current segment.

For example, a display mode of the first switching control is not limited. For example, copywriting information such as "complete original resource" may be included. When it is switched from displaying the target original material segment to displaying the template video, the playback may be started from a starting point of the template video, the playback may also be started from the next original material segment, and there may also be other switching modes.

In some embodiments, the method further includes: in response to a trigger operation for the first switching control, switching to play the template video, wherein the playback position of the template video after switching is the same as the playback position of the target original material segment at the time of switching. When it is switched from displaying the target original material segment to displaying the template video, continuous display is continued according to the playback progress of the currently displayed target original material segment, therefore seamless joint can be realized. In this way, continuous playback can be performed to reduce the interruption feeling, thereby improving the viewing experience of the user. The trigger operation for the first switching control is not specifically limited, for example, it may be a click operation or a sliding operation, etc.

In some embodiments, the method further includes: during the process of displaying the template video, displaying a second switching control, wherein the second switching control is configured to instruct to switch to display the target original material segment. During the process of displaying the template video, the user may be allowed to conveniently switch back to the target original material segment corresponding to the target material segment to be edited, so as to review the content of the target original material segment, thereby facilitating to quickly import the material of the target material segment to be edited, and improving the editing efficiency. A display mode of the second switching control is not limited, for example, copywriting information such as an "original segment" may be included. The second switching control and the first switching control may be different controls, or may also be the same control, and different copywriting information is displayed in different states. The trigger operation for the second switching control is not specifically limited, for example, it may be a click operation or a sliding operation, etc.

In some embodiments, the method further includes: displaying preset prompt information after it is detected that the setting entry for the at least one material segment to be edited has received at least one trigger operation, wherein the preset prompt information is used for instructing to display the template video. In the case that all the material segments to be edited are filled with materials, the complete template video may be conveniently viewed via the preset prompt information, so that a comparison condition of edited multimedia resources created by the user and the template video can be conveniently known. The preset prompt information may be displayed in the import interface, and may also be displayed in another interface, for example, an edited multimedia resource preview interface, wherein a target multimedia resource that is formed after the material segments to be edited imported by the user is edited in the target editing mode may be displayed in the edited multimedia resource preview interface.

In some embodiments, the method may further include: displaying the template video in response to a trigger operation for the preset prompt information; and during the process of displaying the template video, if a preset exit operation is detected, stopping displaying the template video, wherein the setting entry for a set material segment to be edited in the import page is in a selected state, and the set material segment to be edited corresponds to an original material segment to which the playback position of the template video belongs when the exit operation is detected. During the process of viewing the complete template video, if the user discovers that the material imported by a certain edited segment greatly differs from the template video and thus needs to be imported again, the user may directly exit the playback of the template video, for example, exit the original resource playback interface, the preset application program may automatically locate the material segment to be edited corresponding to the current playback position, so that the user can conveniently re-import the material, and the user does not need to manually search for the material segment to be edited which needs to be modified, thereby reducing manual operations of the user, and improving the editing efficiency. The trigger operation of the preset prompt information is not specifically limited, for example, it may be a click operation, etc.

Figure 2:
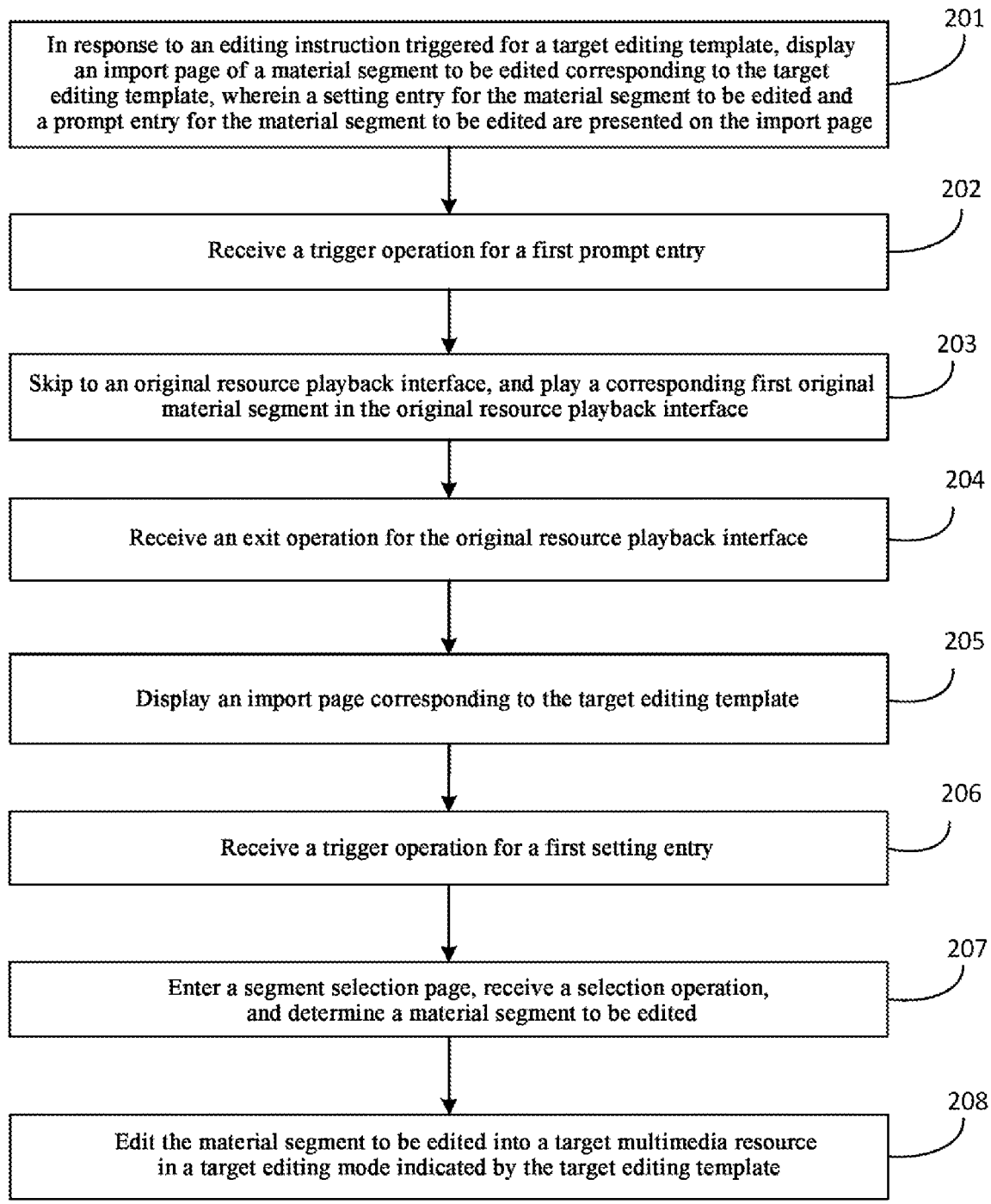
FIG. 2 is a schematic flowchart of another method for a scenario of editing multimedia resources provided according to an embodiment of the present disclosure.

FIG. 2 is a schematic flowchart of another method for a scenario of editing multimedia resources provided in an embodiment of the present disclosure. The embodiment of the present disclosure is refined based on multiple example solutions in the above embodiment, for example, the method includes the following steps:

Step 201, in response to an editing instruction triggered for a target editing template, displaying an import page of a material segment to be edited corresponding to the target editing template, wherein a setting entry for the material segment to be edited and a prompt entry for the material segment to be edited are presented on the import page.

For example, the target editing template is used for indicating that the material segment to be edited is edited into a target multimedia resource in a target editing mode. The target editing template is associated with a template video, the target editing mode is an editing mode utilized by the template video, the target editing template includes multiple edited segments, the template video includes multiple original material segments, the edited segments correspond to the original material segments on a one-to-one basis, and the edited segments correspond to the material segments to be edited on the one-to-one basis. The import page of the target editing template is displayed, wherein the import interface includes setting entries, segment identifiers, and prompt entries respectively corresponding to multiple material segments to be edited which correspond to the target editing template. The segment identifier is used for instructing to select a corresponding material segment to be edited, and the prompt entry is used for instructing to play a corresponding original material segment.

Figure 3:
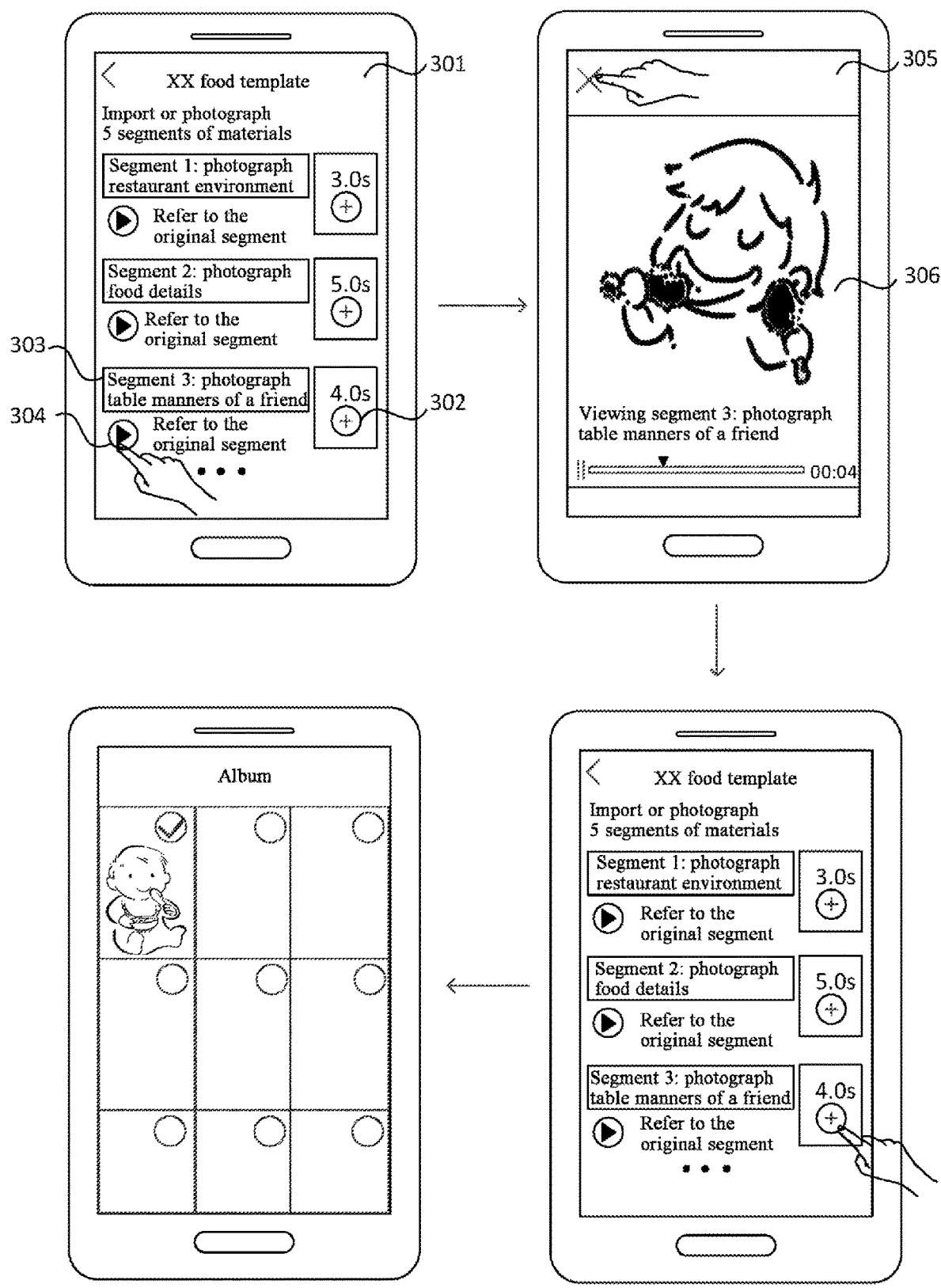
FIG. 3 is a schematic diagram of an interactive interface provided according to an embodiment of the present disclosure.

FIG. 3 is a schematic diagram of an interactive interface provided according to an embodiment of the present disclosure. The import page may correspond to an editing template of a script mode, and the template name may be "XX food template". As shown in FIG. 3, the import page 301 contains setting entries 302 respectively corresponding to multiple material segments to be edited (three material segments to be edited are taken as an example in FIG. 3), segment identifiers 303 respectively corresponding to the multiple material segments to be edited, and prompt entries 304 respectively corresponding to the material segments to be edited. The setting entry 302 may be displayed in a form of a plus sign, and duration information of the corresponding edited segment is displayed therein, for example, 4.0 s (seconds). The segment identifier 303 may contain a segment serial number (e.g., "segment 3") and script prompt information corresponding to the segment (e.g., "photograph the table manners of a friend"), for example, which may be used for instructing the user to select a video clip in which the table manners of the friend are photographed. The prompt entry 304 may include, for example, a playback icon and word information of "refer to original segment".

Step 202, receiving a trigger operation for a first prompt entry.

For example, as shown in FIG. 3, it is assumed that the user wants to fill the segment 3 (corresponding to a target material segment to be edited). Before importing the material, the user may firstly view the original material segment (a target original material segment) corresponding to the segment 3. For example, the user may click the prompt entry 304 (the first prompt entry) corresponding to the segment 3, and then the preset application program may receive the trigger operation input by the user for the prompt entry 304.

Step 203, skipping to an original resource playback interface, and playing a corresponding first original material segment in the original resource playback interface.

As shown in FIG. 3, after the user clicks the prompt entry 304, the preset application program skips to an original resource playback interface 305, and automatically plays a first original material segment 306 (the target original material segment) in the original resource playback interface 305. The user may view image details in the first original material segment 306, so as to select a suitable material.

Step 204, receiving an exit operation for the original resource playback interface.

As shown in FIG. 3, the user may input the exit operation by clicking a close icon.

Step 205, displaying an import page corresponding to the target editing template.

As shown in FIG. 3, after exiting the original resource playback interface, the import page may be returned to.

Step 206, receiving a trigger operation for a first setting entry.

As shown in FIG. 3, after returning to the import page, the user may perform an operation of material selection on a first material segment to be edited by clicking the plus sign in the setting entry 302.

Step 207, entering into a segment selection page, receiving a selection operation, and determining a material segment to be edited.

As shown in FIG. 3, the user may enter into the album in the electronic device, that is, a segment selection page, select a suitable material therefrom, and import the material into the segment 3, so as to determine the import content of the corresponding target material segment to be edited.

For example, the present step may also be replaced with entering into a photographing page, acquiring a real-time photographed image, and generating a corresponding material segment to be edited.

Step 208, editing the material segment to be edited into a target multimedia resource in a target editing mode indicated by the target editing template.

For example, assuming that corresponding material segments to be edited have been determined for the three segments, then the three determined material segments to be edited may be edited in the target editing mode indicated by the target editing template, so as to obtain an expected target multimedia resource for the user.

The method for a scenario of editing multimedia resources provided according to embodiments of the present disclosure may be suitable for a use scenario of the editing template of the script mode. Before a setting entry corresponding to a certain material segment to be edited is triggered, the prompt entry is displayed, so that the user can conveniently view the original material segment in advance. Therefore, after the setting entry is triggered, the user can select a suitable material to participate in editing according to the viewed original material segment, and thus the editing efficiency and the editing effect can be effectively improved.

Figure 4:
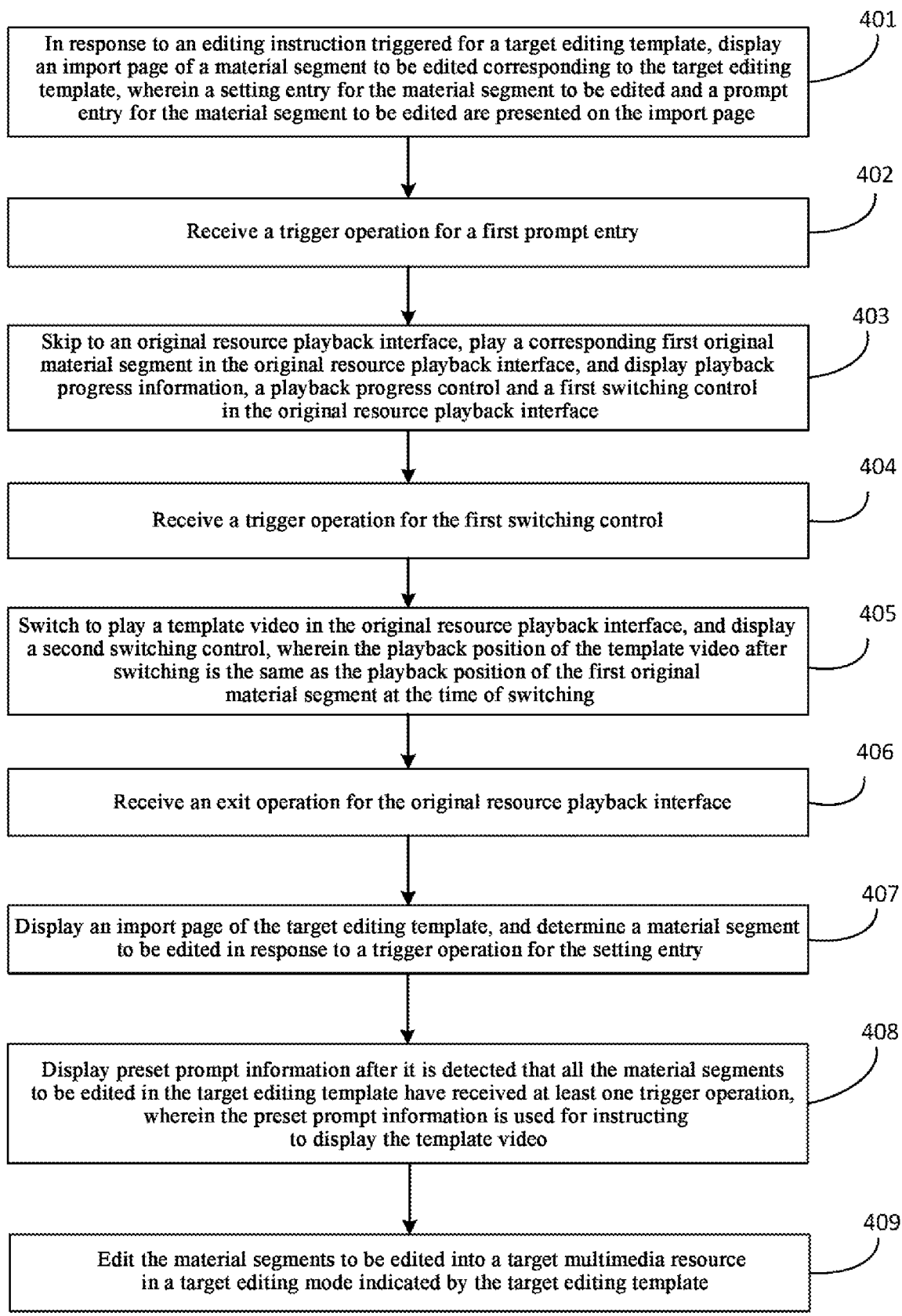
FIG. 4 is a schematic flowchart of yet another method for a scenario of editing multimedia resources provided according to an embodiment of the present disclosure.

FIG. 4 is a schematic flowchart of yet another method for a scenario of editing multimedia resources provided according to an embodiment of the present disclosure. The embodiment of the present disclosure is refined based on multiple example solutions in the above embodiments, for example, the method may include the following steps:

Step 401, in response to an editing instruction triggered for a target editing template, displaying an import page for a material segment to be edited corresponding to the target editing template, wherein a setting entry for the material segment to be edited and a prompt entry for the material segment to be edited are presented on the import page.

For example, the import page of the target editing template is displayed, wherein the import page includes segment identifiers respectively corresponding to multiple material segments to be edited, a first prompt entry corresponding to a first segment identifier that is currently in a selected state, and a setting entry corresponding to a first material segment to be edited (a target material segment to be edited).

For example, if the user enters into the import page for the first time after selecting the target editing template, a segment 1 may be set to be in the selected state by default.

Figure 5:
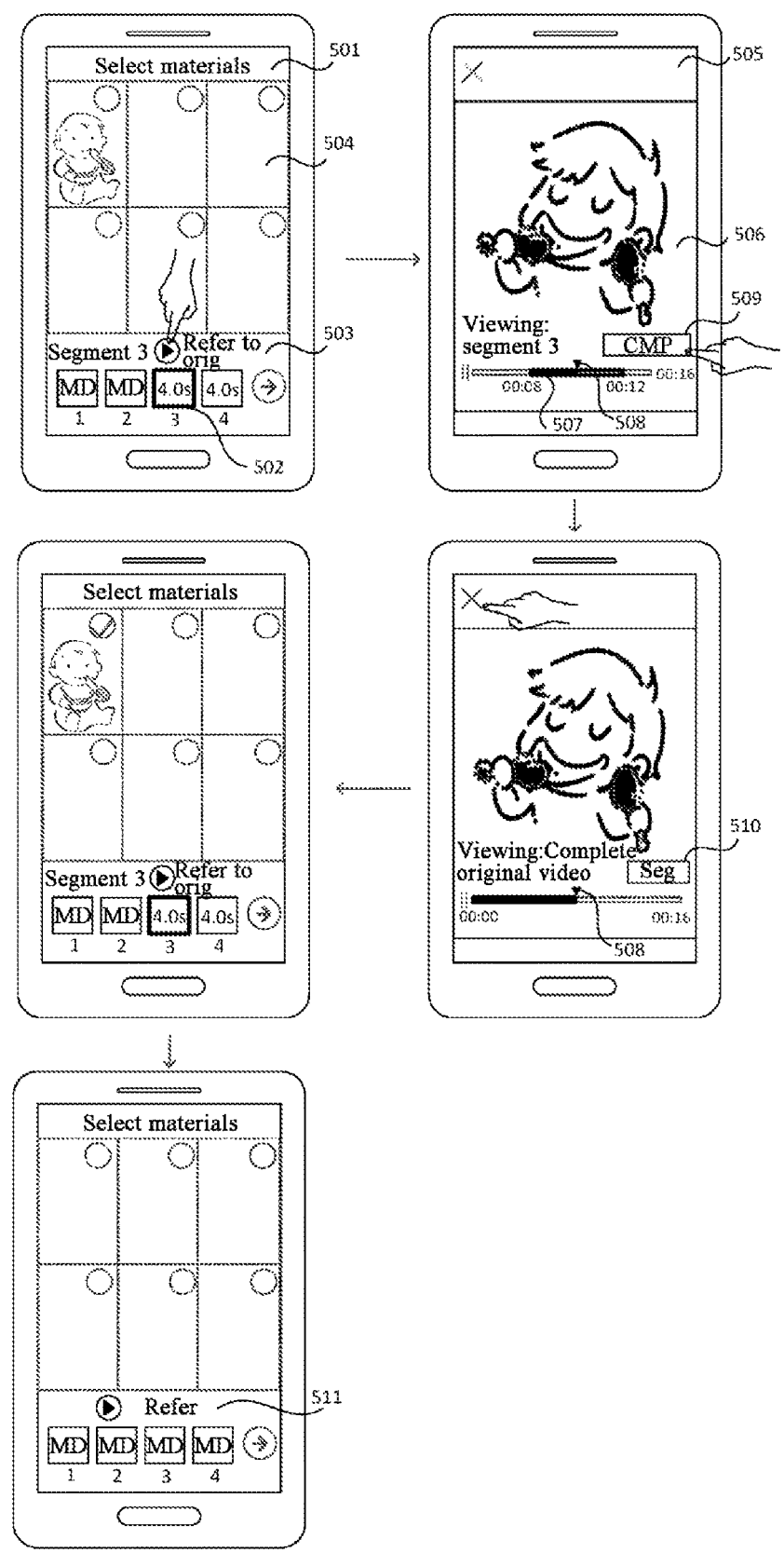
FIG. 5 is schematic diagram of another interactive interface provided according to an embodiment of the present disclosure.

FIG. 5 is a schematic diagram of another interactive interface provided according to an embodiment of the present disclosure. As shown in FIG. 5, an import page 501 contains segment identifiers respectively corresponding to multiple material segments to be edited (four material segments to be edited are taken as an example in the figure, the total number of the material segments to be edited may be greater than 4, and the segment identifiers of more material segments to be edited may be displayed by means of a sliding operation). Assuming that the user currently locates to a segment 3 (corresponding to the target material segment to be edited), then a first segment identifier 502 corresponding to the segment 3 is in the selected state. The import page 501 contains a first prompt entry 503 corresponding to the first segment identifier 502 that is currently in the selected state, and multiple setting entries 504 (which may be understood as identification information of candidate materials) corresponding to the first segment identifier 502. The first segment identifier 502 may be displayed in a form of an icon, the icon displays a segment serial number (e.g., "3") in an associated manner, the icon may respectively correspond to different display states before material filling and after material filling. For example, a duration information (e.g., "4.0 s") of the material segment to be edited is displayed before material filling, "MD" indicating "modifying" is displayed in the figure after material filling. The thumbnail of the filled material (not shown in FIG. 5) may also be displayed in the background of the icon. The first prompt entry 503 may include, for example, a playback icon and word information of "refer to orig" indicating "refer to an original segment", and further includes the serial number of the corresponding edited segment, such as "segment 3" in the figure. The multiple candidate materials may come from a local folder (e.g., an album) of the electronic device, and the setting entry 504 may include image information such as a thumbnail or a cover of the material.

Step 402, receiving a trigger operation for the first prompt entry.

For example, as shown in FIG. 5, when the user wants to fill the segment 3 currently, the user needs to select a certain material from the multiple candidate materials, and thus may firstly view the original material segment (the target original material segment) corresponding to the segment 3. For example, the user may click the first prompt entry 503, and then the preset application program may receive the trigger operation input by the user for the first prompt entry 503.

Step 403, skipping to an original resource playback interface, playing a corresponding first original material segment in the original resource playback interface, and displaying playback progress information, a playback progress control and a first switching control in the original resource playback interface.

The playback progress control is configured to adjust the current playback position of the first original material segment, starting playback position information and ending playback position information of the first original material segment are displayed by a first progress bar, a first ratio of a length of the first progress bar to a length of a complete progress bar of the template video is greater than a second ratio, in which the second ratio is a ratio of a duration of the first original material segment to the total duration of the template video.

As shown in FIG. 5, after the user clicks the first prompt entry 503, the preset application program skips to an original resource playback interface 505, and automatically plays a first original material segment 506 in the original resource playback interface 505. The user may view picture details in the first original material segment 506, so as to select a suitable material. It is assumed that the total duration of the template video is 16 s, the duration of the segment 1 and the duration of the segment 2 are respectively 3 s and 5 s, the duration of the segment 3 is 4 s, a starting playback position of the segment 3 is 8 s, and an ending playback position is 12 s. A first progress bar 507 is further displayed in the original resource playback interface 505, and the starting playback position information (00:08) and the ending the playback position information (00:12) may be respectively displayed on a left end and a right end of the first progress bar 507, the current playback progress is represented by a playback progress control 508, and the duration of the first original material segment accounts for ¼ of the total duration. As shown in FIG. 5, the ratio of the length of the first progress bar 507 to the length of the complete progress bar is greater than ¼, so that it is convenient for the user to more accurately adjust the current playback position of the first original material segment by means of dragging the playback progress control 508. In the current playback state, the user is generally allowed to adjust within a playback range (between 8 seconds and 12 seconds) of the first original material segment. In addition, a first switching control 509 may also be displayed in the original resource playback interface 505, for example, "CMP" indicating a complete original video as shown in FIG. 5.

Step 404, receiving a trigger operation for the first switching control.

As shown in FIG. 5, the user may switch to play the complete template video by clicking the first switching control 509.

Step 405, switching to play a template video in the original resource playback interface, and displaying a second switching control, wherein the playback position of the template video after switching is the same as the playback position of the first original material segment at the time of switching.

As shown in FIG. 5, after it is switched to play the complete template video, the playback may be continued at the playback position before switching, and the position where the first switching control 509 is located is changed to display the second switching control 510. If the user triggers the second switching control 510, it may be switched back to play the first original material segment, for example, the playback is started from 8 s.

Step 406, receiving an exit operation for the original resource playback interface.

It is assumed that during the process of playing the complete template video, it has been played to 15 s, indicating that a segment after the segment 3 has been played, and at this time, the exit operation input by the user is received.

Step 407, displaying an import page of the target editing template, and determining a material segment to be edited in response to a trigger operation for the setting entry, wherein the first segment identifier is in the selected state.

After exiting the original resource playback interface, the user may return to the import page. At this time, the segment identifier of the segment 3 is still in the selected state. The user may perform a material selection operation on the segment 3, and select a suitable setting entry from the multiple setting entries for triggering, so as to select a corresponding material as the material segment to be edited and import the same into the segment 3.

Step 408, displaying preset prompt information after it is detected that all the material segments to be edited in the target editing template have received at least one trigger operation, wherein the preset prompt information is used for instructing to display the template video.

As shown in FIG. 5, assuming that materials have been selected for the four edited segments in the target editing template, the display states of the segment identifiers have become "modify", and at this time, preset prompt information 511 may be displayed, for example, the playback icon and "refer" indicating reference to a complete original video may be shown in FIG. 5. After the user clicks the preset prompt information 511, it may skip to the original resource playback interface and play the complete template video. During the process of displaying the template video in the original resource playback interface, when the user discovers that the material selected by himself/herself greatly differs from the content of some original resources, the user may input the exit operation for the original resource playback interface at any time. For example, the exit operation is input when it is played to 6 s, the segment where the 6 s is located is the segment 2, and at this time, it may be skipped to the import page, and the segment identifier (the target segment identifier) corresponding to the segment 2 in the import page is in the selected state.

Step 409, editing the material segments to be edited into a target multimedia resource in a target editing mode indicated by the target editing template.

According to the method for a scenario of editing multimedia resources provided according to embodiments of the present disclosure, when the setting entry existing in a form of identification information of the candidate materials is displayed, the prompt entry used for instructing to display the corresponding original material segment is displayed simultaneously, such that it is convenient for the user to better compare the original material segment with the candidate materials, so as to select a suitable material more efficiently and more accurately, and thus the editing efficiency and the editing effect can be effectively improved. In addition, in the original resource playback interface, the playback position information may be comprehensively viewed, the current playback position may be conveniently and accurately adjusted, and switching may be performed between viewing a segment and viewing the complete resource, such that the user can refer to the original lens more flexibly, and thus the editing efficiency and the editing effect are improved. After all materials are selected, the complete original lens may also be supported to be viewed, and when the user watches a position needing to be modified, the playback page is exited and the segment to be modified is automatically located, so that the generation efficiency and the generation effect of the editing resource are improved.

Figure 6:
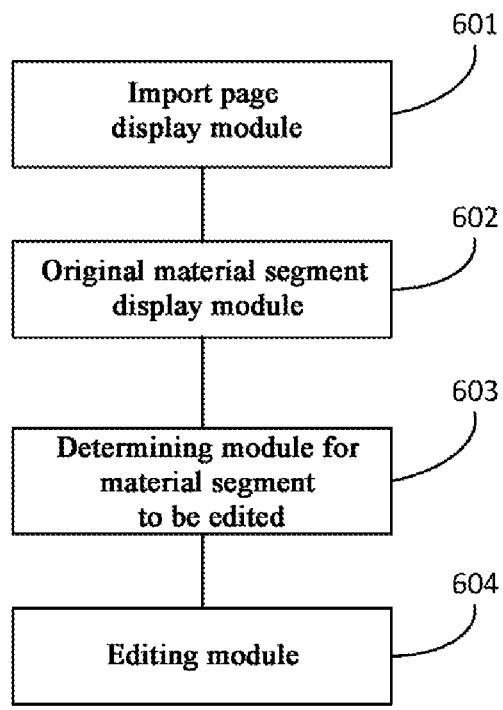
FIG. 6 is a structural block diagram of an apparatus for a scenario of editing multimedia resources provided according to an embodiment of the present disclosure.

FIG. 6 is a structural block diagram of an apparatus for a scenario of editing multimedia resources provided according to an embodiment of the present disclosure. The apparatus may be implemented by software and/or hardware, and may be generally integrated in an electronic device, and information display in the scenario of editing multimedia resources may be performed by executing the method for the scenario of editing multimedia resources. As shown in FIG. 6, the apparatus may include:

an import page display module 601, configured to: in response to an editing instruction triggered for a target editing template, display an import page of at least one material segment to be edited corresponding to the target editing template, wherein the at least one material segment to be edited includes a target material segment to be edited, and a setting entry for the target material segment to be edited and a prompt entry for the target material segment to be edited are presented on the import page of the target material segment to be edited;

an original material segment display module 602, configured to: in response to a trigger for the prompt entry on the import page of the target material segment to be edited, display a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment includes the target original material segment;

a determining module for the material segment to be edited 603, configured to: in response to a trigger operation for the setting entry on the import page of the target material segment to be edited, determine the target material segment to be edited; and an editing module 604, configured to: in the case that the at least one material segment to be edited has been determined, edit the at least one material segment to be edited into a target multimedia resource in the target editing mode.

In the apparatus for a scenario of editing multimedia resources provided according to embodiments of the present disclosure, when the user selects a multimedia material to be edited of a edited segment in the import interface of the material segment to be edited corresponding to the target editing template, a corresponding original material segment may be viewed by triggering the corresponding prompt entry, such that the user can quickly select a proper material to participate in editing with reference to the content and effect in the original material segment, and accordingly, the editing efficiency and the editing effect can be improved.

For example, the trigger operation for the setting entry includes an album-based segment selection operation and/or a camera-based segment photographing operation.

For example, the apparatus further includes: a playback progress display module, configured to display playback progress information of the target original material segment during the process of displaying the target original material segment corresponding to the target material segment to be edited, wherein the playback progress information contains starting playback position information, ending playback position information and the current playback position information of the target original material segment relative to the template video corresponding to the target editing template.

For example, the apparatus may further include: a playback progress control display module, configured to: display a playback progress control while the playback progress information of the target original material segment is displayed, wherein the playback progress control is configured to adjust the current playback position of the target original material segment, the starting playback position information and the ending playback position information of the target original material segment are displayed through a first progress bar, a first ratio of a length of the first progress bar to a length of a complete progress bar of the template video is greater than a second ratio, and the second ratio is a ratio of the duration of the target original material segment to a total duration of the template video.

For example, the apparatus may further include: a first switching control display module, configured to: display a first switching control during the process of displaying the target original material segment corresponding to the target material segment to be edited, wherein the first switching control is configured to instruct to switch to display the template video.

For example, the apparatus may further include: a first switching module, configured to switch to play the template video in response to a trigger operation for the first switching control, wherein the playback position of the template video after switching is the same as the playback position of the target original material segment at the time of switching.

For example, the apparatus may further include: a second switching control display module, configured to display a second switching control during the process of displaying the template video, wherein the second switching control is configured to instruct to switch to display the target original material segment.

For example, the apparatus may further include:
a preset prompt information display module, configured to display preset prompt information after it is detected that the setting entry for the at least one material segment to be edited has received at least one trigger operation, wherein the preset prompt information is used for instructing to display the template video;
a template video display module, configured to display the template video in response to a trigger operation for the preset prompt information; and
an exit module, configured to stop displaying the template video during the process of displaying the template video if a preset exit operation is detected, wherein the setting entry for a set material segment to be edited in the import page is in a selected state, and the set material segment to be edited corresponds to an original material segment to which the playback position of the template video belongs when the exit operation is detected.

Figure 7:
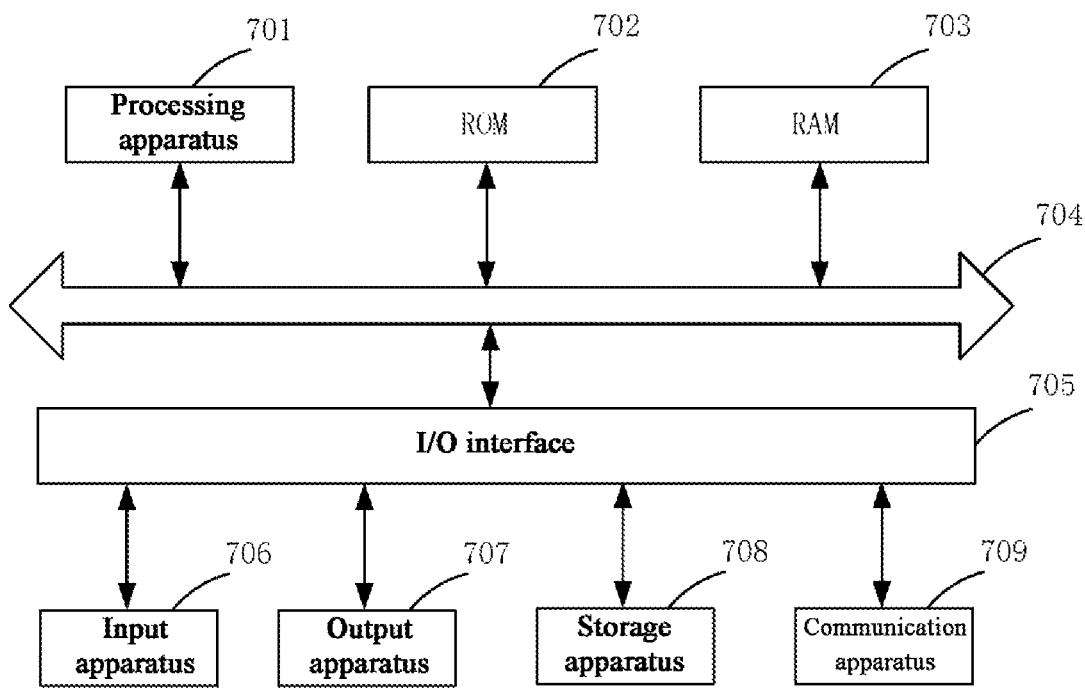
FIG. 7 is a structural block diagram of an electronic device provided according to an embodiment of the present disclosure.

Referring to FIG. 7, which illustrates a schematic structural diagram of an electronic device 700 suitable for implementing the embodiments of the present disclosure. The electronic device according to embodiments of the present disclosure may include, but is not limited to, a mobile terminal such as a mobile phone, a notebook computer, a digital broadcast receiver, a personal digital assistant (PDA), a portable android device (PAD), a portable media player (a PMP), a vehicle-mounted terminal (e.g., a vehicle-mounted navigation terminal), and the like, and a fixed terminal such as a digital TV, a desktop computer, and the like. The electronic device shown in FIG. 7 is merely an example, and should not bring any limitation to the functions and scope of use according to embodiments of the present disclosure.

As shown in FIG. 7, the electronic device 700 may include a processing apparatus (e.g., a central processing unit, a graphics processing unit or the like) 701, which may perform various suitable actions and processes in accordance with a program stored in a read-only memory (ROM) 702 or a program loaded from a storage apparatus 708 into a random access memory (RAM) 703. In the RAM 703, various programs and data needed by the operations of the electronic device 700 are also stored. The processing apparatus 701, the ROM 702 and the RAM 703 are connected to each other via a bus 704. An input/output (I/O) interface 705 is also connected to the bus 704.

In general, the following apparatuses may be connected to the I/O interface 705: an input apparatus 706, including, for example, a touch screen, a touch pad, a keyboard, a mouse, a camera, a microphone, an accelerometer, a gyroscope, and the like; an output apparatus 707, including, for example, a liquid crystal display (LCD), a speaker, a vibrator, and the like; a storage apparatus 708, including, for example, a magnetic tape, a hard disk, and the like; and a communication apparatus 709. The communication apparatus 709 may allow the electronic device 700 to communicate in a wireless or wired manner with other devices to exchange data. While FIG. 7 illustrates the electronic device 700 having various apparatuses, it is to be understood that not all illustrated apparatuses are required to be implemented or provided. More or fewer apparatuses may alternatively be implemented or provided.

According to the embodiments of the present disclosure, the processes described above with reference to the flowcharts may be implemented as computer software programs. For example, embodiments of the present disclosure may include a computer program product, which includes a computer program carried on a non-transitory computer-readable medium, and the computer program contains program codes for performing the method illustrated in the flowcharts. In such embodiments, the computer program may be downloaded and installed from a network via the communication apparatus 709, or installed from the storage apparatus 708, or installed from the ROM 702. When the computer program is executed by the processing apparatus 701, the above functions defined in the method of the embodiments of the present disclosure are performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk-read-only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is included in a baseband or is propagated as part of a carrier, wherein the data signal carries computer-readable program codes. Such propagated data signals may take various forms, including, but not limited to, electromagnetic signals, optical signals, or any suitable combination thereof. The computer-readable signal medium may also be any computer-readable medium other than the computer-readable storage medium, and the computer-readable signal medium may send, propagate or transmit the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

The computer-readable medium may be contained in the above electronic device; and it may also be present separately and is not assembled into the electronic device.

The computer-readable medium carries one or more programs that, when executed by the electronic device, cause the electronic device to: in response to an editing instruction triggered for a target editing template, display an import page of at least one material segment to be edited corresponding to the target editing template, wherein the at least one segment to be edited includes a target material segment to be edited, and a setting entry for the target material segment to be edited and a prompt entry for the target material segment to be edited are presented on the import page of the target material segment to be edited; in response to a trigger for the prompt entry on the import page of the target material segment to be edited, display a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment includes the target original material segment; determine the target material segment to be edited in response to a trigger operation for the setting entry on the import page of the target material segment to be edited; and in the case that the at least one material segment to be edited has been determined, edit the at least one material segment to be edited into a target multimedia resource in the target editing mode.

Computer program codes for executing the operations of the present disclosure may be written in one or more programming languages or combinations thereof. The programming languages include, but not limited to, object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or the server. In the case involving the remote computer, the remote computer may be connected to the user computer through any type of network, including a local area network (LAN) or a wide area network (WAN), or it may be connected to an external computer (e.g., through the Internet using an Internet service provider).

The flowcharts and block diagrams in the drawings illustrate the system architecture, functions, and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions noted in the block may occur out of the order noted in the drawings. For example, two blocks shown in succession may, in fact, be executed substantially concurrently, or the blocks may sometimes be executed in a reverse order, depending upon the functions involved. It should also be noted that each block of the block diagrams and/or flowcharts, and combinations of the blocks in the block diagrams and/or flowcharts may be implemented by dedicated hardware-based systems for performing specified functions or operations, or combinations of dedicated hardware and computer instructions.

The modules involved in the described embodiments of the present disclosure may be implemented in a software or hardware manner. The names of the modules do not constitute limitations for the modules themselves in a certain case. For example, the editing module may also be described as "in the case that the at least one material segment to be edited has been determined, editing the at least one material segment to be edited into a target multimedia resource in the target editing mode."

The functions described herein above may be performed, at least in part, by one or more hardware logic components. For example, without limitation, example types of the hardware logic components that may be used may include: field programmable gate arrays (FPGAs), application-specific integrated circuits (ASICs), application-specific standard products (ASSPs), system on chips (SOCs), complex programmable logic devices (CPLDs), and so on.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

According to one or more embodiments of the present disclosure, a method for a scenario of editing multimedia resources is provided, the method may include:

in response to an editing instruction triggered for a target editing template, displaying an import page of at least one material segment to be edited corresponding to the target editing template, wherein the at least one segment to be edited includes a target material segment to be edited, and a setting entry for the target material segment to be edited and a prompt entry for the target material segment to be edited are presented on the import page of the target material segment to be edited;

in response to a trigger for the prompt entry on the import page of the target material segment to be edited, displaying a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment includes the target original material segment;

in response to a trigger operation for the setting entry on the import page of the target material segment to be edited, determining the target material segment to be edited; and in the case that the at least one material segment to be edited has been determined, editing the at least one material segment to be edited into a target multimedia resource in the target editing mode.

For example, the trigger operation for the setting entry includes an album-based segment selection operation and/or a camera-based segment photographing operation.

For example, during the process of displaying the target original material segment corresponding to the target material segment to be edited, the method further includes:

displaying playback progress information of the target original material segment, wherein the playback progress information contains starting playback position information, ending playback position information and the current playback position information of the target original material segment relative to the template video.

For example, while the playback progress information of the target original material segment is displayed, the method further includes:

displaying a playback progress control, wherein the playback progress control is configured to adjust the current playback position of the target original material segment, the starting playback position information and the ending playback position information of the target original material segment are displayed by means of a first progress bar, a first ratio of a length of the first progress bar to a length of a complete progress bar of the template video is greater than a second ratio, in which the second ratio is a ratio of a duration of the target original material segment to a total duration of the template video.

For example, during the process of displaying the target original material segment corresponding to the target material segment to be edited, the method further includes:

displaying a first switching control, wherein the first switching control is configured to instruct to switch to display the template video.

For example, the method for the scenario of editing multimedia resources further includes:

in response to a trigger operation for the first switching control, switching to play the template video, wherein the playback position of the template video after switching is the same as the playback position of the target original material segment at the time of switching.

For example, the method for the scenario of editing multimedia resources further includes:

displaying a second switching control during the process of displaying the template video, wherein the second switching control is configured to instruct to switch to display the target original material segment.

For example, the method for the scenario of editing multimedia resources further includes:

displaying preset prompt information after it is detected that the setting entry for the at least one material segment to be edited has received at least one trigger operation, wherein the preset prompt information is used for instructing to display the template video;

displaying the template video in response to a trigger operation for the preset prompt information; and during the process of displaying the template video, stopping displaying the template video if a preset exit operation is detected, wherein the setting entry for a set material segment to be edited in the import page is in a selected state, and the set material segment to be edited corresponds to an original material segment to which the playback position of the template video belongs when the exit operation is detected.

According to one or more embodiments of the present disclosure, an apparatus for the scenario of editing multimedia resources is provided, the apparatus may include:

an import page display module, configured to: in response to an editing instruction triggered for a target editing template, display an import page of at least one material segment to be edited corresponding to the target editing template, wherein the at least one segment to be edited includes a target material segment to be edited, and a setting entry for the target material segment to be edited and a prompt entry for the target material segment to be edited are presented on the import page of the target material segment to be edited;

an original material segment display module, configured to: in response to a trigger for the prompt entry on the import page of the target material segment to be edited, display a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment includes the target original material segment;

a determining module for a material segment to be edited, configured to: in response to a trigger operation for the setting entry on the import page of the target material segment to be edited, determine the target material segment to be edited; and an editing module, configured to: in the case that the at least one material segment to be edited has been determined, edit the at least one material segment to be edited into a target multimedia resource in the target editing mode.

In addition, although multiple operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

The invention claimed is:

1. A method for a scenario of editing multimedia resources, comprising:

in response to an editing instruction triggered for a target editing template, displaying an import page of at least one material segment to be edited corresponding to the target editing template, wherein the at least one segment to be edited comprises a target material segment to be edited, and a setting entry for the target material segment to be edited and a prompt entry for the target material segment to be edited are presented on the import page of the target material segment to be edited;

in response to a trigger for the prompt entry on the import page of the target material segment to be edited, displaying a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment comprises the target original material segment;

in response to a trigger operation for the setting entry on the import page of the target material segment to be edited, determining the target material segment to be edited; and in response to determining that the at least one material segment to be edited has been determined, editing the at least one material segment to be edited into a target multimedia resource in the target editing mode.

2. The method according to claim 1, wherein the trigger operation for the setting entry comprises an album-based segment selection operation and/or a camera-based segment photographing operation.

3. The method according to claim 1, wherein displaying the target original material segment corresponding to the target material segment to be edited further comprises:

displaying playback progress information of the target original material segment, wherein the playback progress information contains starting playback position information, ending playback position information, and current playback position information of the target original material segment relative to the template video.

4. The method according to claim 3, wherein while the playback progress information of the target original material segment is displayed, the method further comprises:

displaying a playback progress control, wherein the playback progress control is configured to adjust the current playback position of the target original material segment, the starting playback position information and the ending playback position information of the target original material segment are displayed through a first progress bar, a first ratio of a length of the first progress bar to a length of a complete progress bar of the template video is greater than a second ratio, wherein the second ratio is a ratio of a duration of the target original material segment to a total duration of the template video.

5. The method according to claim 1, wherein displaying the target original material segment corresponding to the target material segment to be edited further comprises:

displaying a first switching control, wherein the first switching control is configured to instruct to switch to display the template video.

6. The method according to claim 5, further comprising:

in response to a trigger operation for the first switching control, switching to play the template video, wherein a playback position of the template video after switching is the same as a playback position of the target original material segment at the time of switching.

7. The method according to claim 5, further comprising:

during a process of displaying the template video, displaying a second switching control, wherein the second switching control is configured to instruct to switch to display the target original material segment.

8. The method according to claim 7, further comprising:

displaying preset prompt information after it is detected that the setting entry for the at least one material segment to be edited has respectively received at least one trigger operation, wherein the preset prompt information is used for instructing to display the template video;

displaying the template video in response to a trigger operation for the preset prompt information; and during a process of displaying the template video, stopping displaying the template video upon determining that a preset exit operation is detected, wherein the setting entry for a set material segment to be edited in the import page is in a selected state, and the set material segment to be edited corresponds to an original material segment to which a playback position of the template video belongs when the exit operation is detected.

9. An electronic device, comprising:

a memory, a processor, and a computer program stored in the memory, when executed by the processor, cause the processor to perform steps of:

in response to an editing instruction triggered for a target editing template, displaying an import page of at least one material segment to be edited corresponding to the target editing template, wherein the at least one segment to be edited comprises a target material segment to be edited, and a setting entry for the target material segment to be edited and a prompt entry for the target material segment to be edited are presented on the import page of the target material segment to be edited;

in response to a trigger for the prompt entry on the import page of the target material segment to be edited, displaying a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment comprises the target original material segment;

in response to a trigger operation for the setting entry on the import page of the target material segment to be edited, determining the target material segment to be edited; and in response to determining that the at least one material segment to be edited has been determined, editing the at least one material segment to be edited into a target multimedia resource in the target editing mode.

10. The electronic device according to claim 9, wherein the trigger operation for the setting entry comprises an album-based segment selection operation and/or a camera-based segment photographing operation.

11. The electronic device according to claim 9, wherein during a process of displaying the target original material segment corresponding to the target material segment to be edited, the computer program further causes the processor to perform a step of:

displaying playback progress information of the target original material segment, wherein the playback progress information contains starting playback position information, ending playback position information, and current playback position information of the target original material segment relative to the template video.

12. The electronic device according to claim 11, wherein while the playback progress information of the target original material segment is displayed, the computer program further causes the processor to perform a step of:
displaying a playback progress control, wherein the playback progress control is configured to adjust the current playback position of the target original material segment, the starting playback position information and the ending playback position information of the target original material segment are displayed through a first progress bar, a first ratio of a length of the first progress bar to a length of a complete progress bar of the template video is greater than a second ratio, wherein the second ratio is a ratio of a duration of the target original material segment to a total duration of the template video.

13. The electronic device according to claim 9, wherein during a process of displaying the target original material segment corresponding to the target material segment to be edited, the computer program further causes the processor to perform a step of:
displaying a first switching control, wherein the first switching control is configured to instruct to switch to display the template video.

14. The electronic device according to claim 13, the computer program further causes the processor to perform a step of:
in response to a trigger operation for the first switching control, switching to play the template video, wherein a playback position of the template video after switching is the same as a playback position of the target original material segment at the time of switching.

15. The electronic device according to claim 13, the computer program further causes the processor to perform a step of:
during a process of displaying the template video, displaying a second switching control, wherein the second switching control is configured to instruct to switch to display the target original material segment.

16. The electronic device according to claim 9, the computer program further causes the processor to perform a step of:
displaying preset prompt information after it is detected that the setting entry for the at least one material segment to be edited has respectively received at least one trigger operation, wherein the preset prompt information is used for instructing to display the template video;
displaying the template video in response to a trigger operation for the preset prompt information; and
during a process of displaying the template video, stopping displaying the template video if a preset exit operation is detected, wherein the setting entry for a set material segment to be edited in the import page is in a selected state, and the set material segment to be edited corresponds to an original material segment to which a playback position of the template video belongs when the exit operation is detected.

17. A non-transitory computer-readable storage medium, on which a computer program is stored, wherein when executed by a processor, the computer program causes an electronic device to perform steps of:
in response to an editing instruction triggered for a target editing template, displaying an import page of at least one material segment to be edited corresponding to the target editing template, wherein the at least one segment to be edited comprises a target material segment to be edited, and a setting entry for the target material segment to be edited and a prompt entry for the target material segment to be edited are presented on the import page of the target material segment to be edited;
in response to a trigger for the prompt entry on the import page of the target material segment to be edited, displaying a target original material segment corresponding to the target material segment to be edited, wherein the target editing template has a corresponding template video, the template video is a video which is formed by editing at least one original material segment in a target editing mode indicated by the target editing template, the at least one original material segment corresponds to the at least one material segment to be edited on a one-to-one basis, and the at least one original material segment comprises the target original material segment;
in response to a trigger operation for the setting entry on the import page of the target material segment to be edited, determining the target material segment to be edited; and
in response to determining that the at least one material segment to be edited has been determined, editing the at least one material segment to be edited into a target multimedia resource in the target editing mode.

18. The non-transitory computer-readable storage medium of claim 17, wherein the trigger operation for the setting entry comprises an album-based segment selection operation and/or a camera-based segment photographing operation.

19. The non-transitory computer-readable storage medium of claim 18, wherein displaying the target original material segment corresponding to the target material segment to be edited further comprises:
displaying playback progress information of the target original material segment, wherein the playback progress information contains starting playback position information, ending playback position information, and current playback position information of the target original material segment relative to the template video.

20. The non-transitory computer-readable storage medium of claim 18, wherein displaying the target original material segment corresponding to the target material segment to be edited further comprises:
displaying a first switching control, wherein the first switching control is configured to instruct to switch to display the template video.

* * * * *